US011396183B2

United States Patent
(12) United States Patent
Plymale et al.

(10) Patent No.: US 11,396,183 B2
(45) Date of Patent: Jul. 26, 2022

(54) PRINTERS AND ASSOCIATED PRINTER MAINTENANCE

(71) Applicant: HEWLETT-PACKARD DEVELOPMENT COMPANY, L.P., Houston, TX (US)

(72) Inventors: James D. Plymale, Vancouver, WA (US); Donnell D. Daniels, Vancouver, WA (US); Kyle Mannari, Vancouver, WA (US); Jeffrey A. Wagner, Vancouver, WA (US); Weiyun Sun, Vancouver, WA (US); Rachelle Cobb, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 819 days.

(21) Appl. No.: 16/074,835

(22) PCT Filed: Apr. 13, 2017

(86) PCT No.: PCT/US2017/027442
§ 371 (c)(1),
(2) Date: Aug. 2, 2018

(87) PCT Pub. No.: WO2018/190849
PCT Pub. Date: Oct. 18, 2018

(65) Prior Publication Data

US 2021/0206171 A1 Jul. 8, 2021

(51) Int. Cl.
*B41J 2/165* (2006.01)

(52) U.S. Cl.
CPC ....... *B41J 2/16535* (2013.01); *B41J 2/16526* (2013.01); *B41J 2/16544* (2013.01); *B41J 2002/1655* (2013.01)

(58) Field of Classification Search
CPC ................ B41J 2/16535; B41J 2/16526; B41J 2/16544; B41J 2002/1655
See application file for complete search history.

(56) References Cited

U.S. PATENT DOCUMENTS 4,571,601 A * 2/1986 Teshima .............. B41J 2/16508 347/31
7,993,466 B2 * 8/2011 Aude .................. B41J 2/16535 134/6

(Continued)

FOREIGN PATENT DOCUMENTS

EP 2905142 A2 8/2015
EP 2905142 A3 8/2015

(Continued)

OTHER PUBLICATIONS

HP PageWide Technology, Features and user benefits, retrieved from Internet—https://www.kautbullinger.de/buero-systemhaus/engineering/hp-pagewide-xl/da, Oct. 2014, 8 pages.

*Primary Examiner* — Geoffrey S Mruk
(74) *Attorney, Agent, or Firm* — HP Inc. Patent Development

(57) ABSTRACT

Printers and associated printer maintenance methods and apparatus are disclosed. An example printer includes a nozzle to dispense fluid; a wiper to wipe the nozzle during a maintenance event; and a controller to cause the nozzle to dispense fluid during the maintenance event while the wiping material engages or is immediately adjacent the nozzle to deter a substance from being present within the nozzle.

21 Claims, 5 Drawing Sheets

(56) References Cited

U.S. PATENT DOCUMENTS

| | | | |
|---|---|---|---|
| 8,556,378 | B2 | 10/2013 | Hutchison |
| 2003/0035019 | A1 | 2/2003 | Dietl et al. |
| 2003/0081047 | A1 | 5/2003 | Yearout |
| 2009/0179962 | A1 | 7/2009 | Karppinen et al. |
| 2013/0257980 | A1 | 10/2013 | Ibe et al. |
| 2014/0198156 | A1* | 7/2014 | Murayama ........... B41J 2/16535 347/33 |
| 2015/0174824 | A1 | 6/2015 | Gifford et al. |
| 2017/0015101 | A1 | 1/2017 | Coma et al. |

FOREIGN PATENT DOCUMENTS

| | | | |
|---|---|---|---|
| JP | 2006205712 | A | 8/2006 |
| JP | 2016155279 | A | 9/2016 |
| WO | 2012084686 | A1 | 6/2012 |

* cited by examiner

PRINTERS AND ASSOCIATED PRINTER MAINTENANCE

BACKGROUND

Additive manufacturing systems may be used to produce three-dimensional objects. In some examples, the three-dimensional objects are produced in layers using build material.

Figure 1:
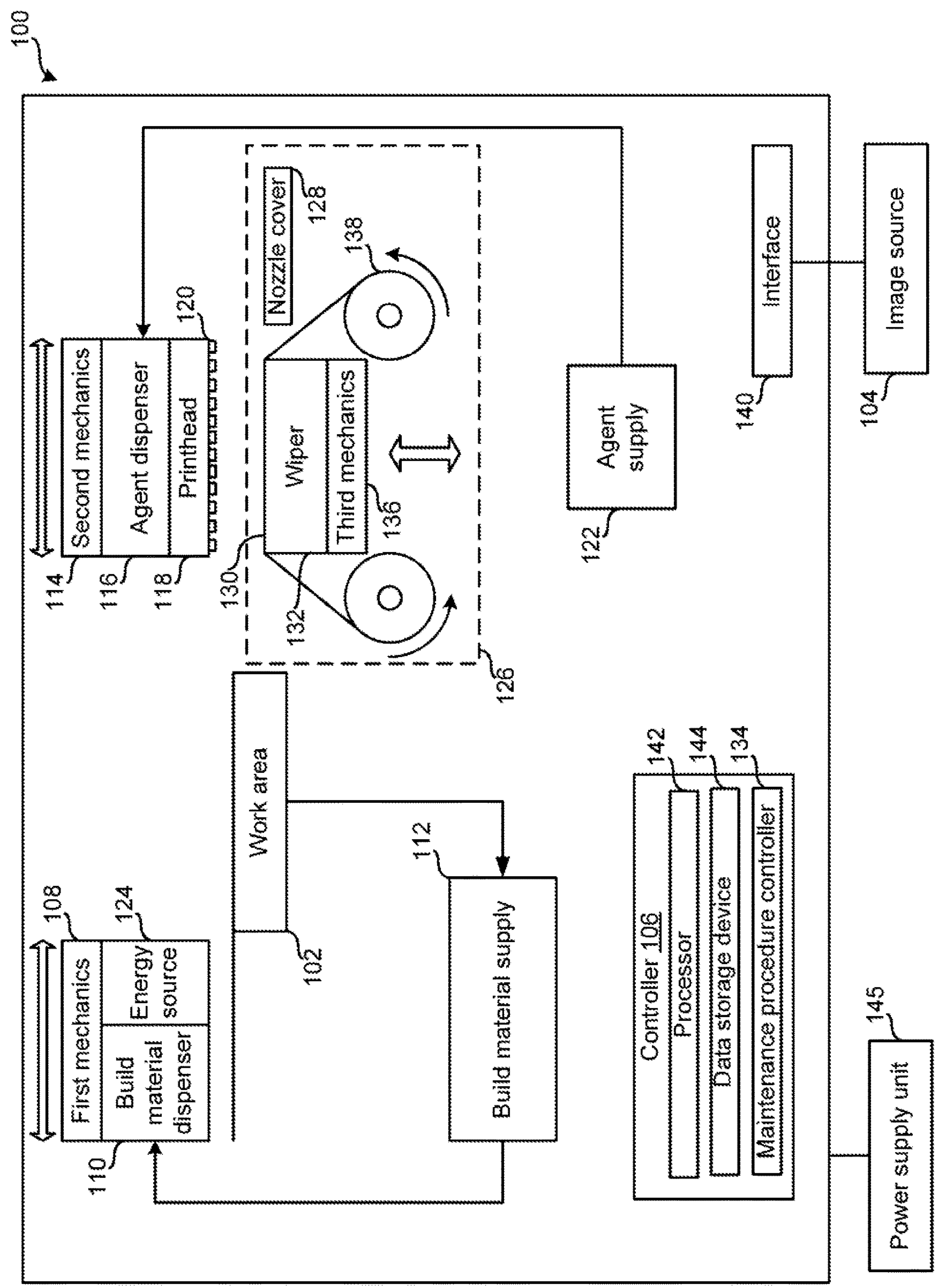
FIG. 1 is a schematic illustration of an example printer in accordance with the teachings of this disclosure.

The figures are not to scale. Wherever possible, the same reference numbers will be used throughout the drawing(s) and accompanying written description to refer to the same or like parts. While the drawings illustrate examples of printers and associated printer maintenance methods and apparatus, other examples may be employed to implement the examples disclosed herein.

DETAILED DESCRIPTION

The examples disclosed herein relate to printers that deter substances from entering a liquid dispensing nozzle(s) during a maintenance event and/or otherwise. While the examples disclosed herein may deter any unwanted substance from entering a liquid dispensing nozzle(s), in some examples, the substance includes particulate, fluid and/or air. Thus, the examples disclosed herein may be used to increase the useful life of nozzles of three-dimensional (3D) printers (e.g., additive manufacturing systems), two-dimensional (2D) printers and/or other apparatus including a liquid dispensing nozzle(s). In examples in which the substance is a build material, such as a powder-type or particulate build material, used in association with additive manufacturing systems, the nozzle(s) may be configured to dispense an agent (e.g., a fusing agent, a detailing agent) that is used when building the three-dimensional object. In examples in which the substance is a substrate particle, the nozzle(s) may be configured to dispense printing liquid (e.g., ink) and/or toner onto a substrate (e.g., paper).

Regardless of whether the substance includes the build material of a 3D printer and/or includes the substrate particles of a 2D printer, the examples disclosed herein are configured to deter unwanted substances from being present within nozzles. In some examples, the substance is deterred from entering the nozzle by performing an example maintenance event that includes wiping the nozzle with a wiping material and/or wiper.

In examples in which the nozzle(s) is implemented on a 3D printer, build material may become airborne and land on different internal structures of the printer including the wiping material and/or the nozzle(s) as the additive manufacturing process takes place. The additive manufacturing process may include sequentially forming layers of build material on a work area, selectively depositing an agent(s) on the layer(s) and applying energy to the build material to selectively fuse the build material to form an object(s). The build material may be particulate that may become positioned within the nozzles(s) and disrupt the flow of fluid through the nozzle(s).

To remove particulate from the nozzle(s), a maintenance event may be performed in which, among other things, the nozzle is drawn across the wiping material and/or the wiping material is drawn across the nozzle. In other examples, the maintenance event may be performed for a number of other reasons including, removing a particle(s), a substance(s), an agent, a printing liquid, an ink, etc. from the exterior of the nozzle(s), removing fluid from the exterior of the nozzle(s), etc. In either of these examples, the position of the wiping material and/or the position of the nozzle may be known. However, while the interaction between the wiping material and the nozzle(s) transfers some of the particulate from the nozzle(s) to the wiping material, the prior presence of particulate on the wiping material and/or the nozzle(s), back-pressure of the nozzle and/or an associated printhead and/or the interaction between the wiping material and the nozzle(s) may cause some particulate to enter the nozzle(s) during the maintenance event and/or may cause some particulate to remain and/or become further lodged within the nozzle(s) during the maintenance event.

To deter particulate from entering the nozzle(s) and/or to encourage particulate from exiting the nozzle(s) during the maintenance event, in some examples, fluid is ejected from the nozzle(s) during the maintenance event and/or onto the wiping material. In other words, the examples disclosed herein deter particulate from entering the nozzle(s) and/or encourage particulate from exiting the nozzle(s) during the maintenance event by further saturating wiping material by flowing fluid out of the nozzle(s) (e.g., firing the printhead) as the wiping material engages the nozzle(s).

By ejecting fluid from the nozzle(s) during the maintenance event, in some examples, a temperature of the nozzle(s) is increased to encourage fluid flow and/or decrease the viscosity of the fluid and/or substance(s) within the nozzle. Additionally and/or alternatively, by ejecting fluid from the nozzle(s) during the maintenance event, in some examples, fluid and/or particulate are urged out of the nozzle(s) by the outflux of fluid from the nozzle(s). Additionally and/or alternatively, by ejecting fluid from the nozzle(s) during the maintenance event, the wiping material actively engages the fluid and/or particle(s) that are being urged out of the nozzle(s) to disengage the fluid and/or particle(s) from the nozzle(s) and transfer the fluid and/or particle(s) to the wiping material, etc. Additionally and/or alternatively, by ejecting fluid from the nozzle(s) during the maintenance event, in some examples, additional fluid and/or particulate may be drawn from the nozzle into the wiping material as compared to if fluid were not ejected during the maintenance event.

The fluid may be ejected from the nozzle(s) in a pattern and/or a manner to discourage the ingress of particulate into the nozzle(s) based on time (e.g., a time-based equation) and/or the position of the wiper, the wiping material and/or the nozzle(s) (e.g., a position-based equation). In some examples, when the fluid is ejected from the nozzle(s) in a pattern and/or a manner to discourage the ingress of particulate into the nozzle(s) based on time, a trigger is included that, when initiated, causes fluid to be ejected from the nozzle(s) for a threshold amount of time at a given frequency. In some examples, when the fluid is ejected from the nozzle(s) in a pattern and/or a manner to discourage the ingress of particulate into the nozzle(s) based on position, a print image is generated to enable the location of the nozzle(s) to be determined such that fluid is ejected from the nozzle(s) when the nozzle(s) is positioned over the wiping material.

In some examples, additional fluid may be dispensed from the nozzle(s) when the wiping material is spaced from the nozzle(s) to further discourage the ingress of particulate into the nozzle(s) and/or to further encourage the ejection of particulate from the nozzle(s). The additional fluid may be dispensed from the nozzle before and/or after the wiping material covers and/or engages the nozzle(s). In other examples, the maintenance event may include ejecting fluid from the nozzle(s) when the wiping material is spaced from the nozzle(s).

FIG. 1 is a block diagram of an example printer 100 that can be used to implement the teachings of this disclosure. The printer 100 of FIG. 1 is implemented as a 3D printer that may be used to generate objects, parts, etc. To generate an object on an example work area (e.g., a bed) 102, in the illustrated example, the printer 100 includes an image source 104 from which the printer 100 receives an image(s) and/or other data (e.g., a file) describing the object(s) to be produced on the work area 102.

To produce the object(s) on the work area 102 based on the image(s) and/or other data describing the object, an example controller 106 causes example first mechanics 108 to move an example build material dispenser 110 relative to the work area 102 to dispense a layer(s) of build material on the work area 102. In some examples, the build material dispenser 110 includes a wiper, a roller, etc. to distribute and/or dispense the build material on the work area 102. In the illustrated example, the build material is accessed from an example build material supply 112.

To enable the build material to be selectively fused and/or coupled to form the object(s), the controller 106 causes example second mechanics 114 to move an example agent dispenser 116 including an associated example printhead 118 and nozzles 120 relative to the work area 102 and overtop of the layer of build material. In some examples, the nozzles 120 selectively deposit agent on the build material as the nozzles 120 are moved by the second mechanics 114. In the illustrated example, the agent dispenser 116 and/or the printhead 118 draws and/or accesses the agent from an example agent supply 122. The agent supply 122 may include a chamber(s) (e.g., 1, 2, 3, etc.) that house an agent(s) (e.g., 1, 2, 3, 4 types of agents) and/or another fluid(s) used during the additive manufacturing process. In some examples, the agent includes a fusing agent, a detailing agent, an agent(s) associated with accuracy and/or detail, an agent(s) associated with opacity and/or translucency and/or an agent(s) associated with surface roughness, texture and/or friction. Additionally or alternatively, in some examples, the agent includes an agent(s) associated with strength, elasticity and/or other material properties, an agent(s) associated with color (e.g., surface and/or embedded) and/or an agent(s) associated with electrical and/or thermal conductivity.

In the illustrated example, to selectively fuse and/or solidify the build material where the agent has been applied to the build material, the controller 106 causes the first mechanics 108 to move an example energy source 124 relative to the work area 102 and apply energy to the build material on the work area 102. The energy source 124 may apply any type of energy to selectively cause the build material to fuse and/or solidify. For example, the energy source 124 may include an infra-red (IR) light source, a near infra-red light source, a laser, etc. While the energy source 124 is illustrated in FIG. 1 as being positioned adjacent the build material dispenser 110 and moved by the first mechanics 108, in other examples, the energy source 124 may be positioned adjacent the agent dispenser 116 and moved by the second mechanics 114. In other examples, the energy source 124 may be moved by dedicated mechanics and/or stationarily disposed relative to the work area 102.

During the process of forming the object(s) on the work area 102, the build material may deposit on the nozzles 120 and/or the build material may become airborne within the printer 100. Further, during the process of ejecting the agent from the nozzle(s) 120, some of the agent may remain within the nozzle(s) 120. To deter the build material from entering and/or remaining with the nozzle(s) 120 and/or to deter remaining agent from solidifying within the nozzle(s) 120, in the illustrated example, the example printer 100 includes an example maintenance module 126. In this example, the maintenance module 126 includes an example nozzle cover 128 that covers the nozzle(s) 120 when not in use. Further, in the illustrated example, the maintenance module 126 includes wiping material 130 and/or a wiper 132 used when performing a wiping and/or maintenance event that draws agent out of the nozzle(s) 120 to deter solidification of the agent within the nozzle(s) 120 and/or to deter the build material from entering and/or remaining within the nozzle(s) 120. In some examples, the wiper 134 includes a spring-biased follower to urge the wiping material 130 into engagement with the nozzles 120. In some examples, the wiping material 130 includes a cloth and/or other absorbent material.

In the illustrated example, the controller 106 includes an example maintenance procedure controller 134 to determine when to perform a maintenance event. In some examples, the maintenance procedure controller 134 determines to perform a maintenance event after a threshold amount of time has lapsed, after a threshold number of object(s) have been built, after a threshold amount of build material has been used, etc. Regardless of why the maintenance procedure controller 134 determines to perform a maintenance event, in some examples, during the maintenance event, the maintenance procedure controller 134 causes the nozzle cover 128 to be removed from the nozzles 120. Further, in some examples, during the maintenance event, the maintenance procedure controller 134 causes the wiping material 130 to be moved relative to and/or drawn across the nozzles 120 via example third mechanics 136 and/or for the nozzles 120 to be moved relative to and/or drawn across the wiping material 130 via the second mechanics 114. More specifically, in some examples, the maintenance event includes the nozzles 120 being uncovered, the wiping material 130 being moved to engage the printhead 118 via the third mechanics 136 and the nozzles 120 being drawn across the wiping material 130 via the second mechanics 114. In the illustrated example, the maintenance module 126 may include a roll 138 of the wiping material 130 that is advanceable such that a clean and/or unused portion of the wiping material 130 can be used to wipe the nozzles 120 during the maintenance event.

In some examples, to increase the draw of the agent from the nozzles 120 during the maintenance event and/or to further encourage build material from exiting and/or not entering the nozzles 120, the maintenance procedure controller 134 causes the nozzle(s) 120 to eject the agent from the nozzle(s) 120 and/or onto the wiping material 130 during the maintenance event. Thus, in such examples, additional agent and/or build material can be expelled from the nozzle(s) 120 onto the wiping material 130 during the maintenance event as compared to if agent were not ejected from the nozzle(s) 120 during the maintenance event. The maintenance procedure controller 134 may cause the agent dispenser 116, the printhead 118 and/or the nozzle(s) 120 to eject the agent(s) in a pattern and/or a manner to discourage particulate entering and/or being within the nozzle(s) 120 based on time (e.g., a time-based algorithm) and/or the position of the wiper 132, the wiping material 130 and/or the nozzle(s) 120 (e.g., a position-based algorithm).

The example printer 100 of FIG. 1 includes an interface 140 to interface with the image source 104. The interface 140 may be a wired or wireless connection connecting the printer 100 and the image source 104. The image source 104 may be a computing device from which the printer 100 receives data describing a task (e.g., an object to form, a print job, etc.) to be executed by the controller 106. In some examples, the interface 140 facilitates the printer 100 and/or a processor 142 to interface with various hardware elements, such as the image source 104 and/or hardware elements that are external and/or internal to the printer 100. In some examples, the interface 140 interfaces with an input or output device, such as, for example, a display device, a mouse, a keyboard, etc. The interface 140 may also provide access to other external devices such as an external storage device, network devices, such as, for example, servers, switches, routers, client devices, other types of computing devices and/or combinations thereof.

The example controller 106 includes the example processor 142, including hardware architecture, to retrieve and execute executable code from an example data storage device 144. The executable code may, when executed by the example processor 142, cause the processor 142 to implement at least the functionality of controlling the first mechanics 108 and/or the build material dispenser 110 to dispense build material on the work area 102, the second mechanics 114 and/or the agent dispenser 116 including the associated printhead 118 and the nozzles 120 to dispense the agent onto the build material and/or the first mechanics 108 and/or the energy source 124 to apply energy to the build material on the work area 102 to form the object(s). The executable code may, when executed by the example processor 142, cause the processor 142 to provide instructions to an example power supply unit 145, to cause the power supply unit 145 to provide power to the example printhead 118 to eject a fluid from the example nozzle(s) 120.

The data storage device 144 of FIG. 1 stores instructions that are executed by the example processor 142 or other processing devices. The example data storage device 144 may store computer code representing a number of applications, firmware, machine readable instructions, etc. that the example processor 142 executes to implement the examples disclosed herein.

Figure 2:
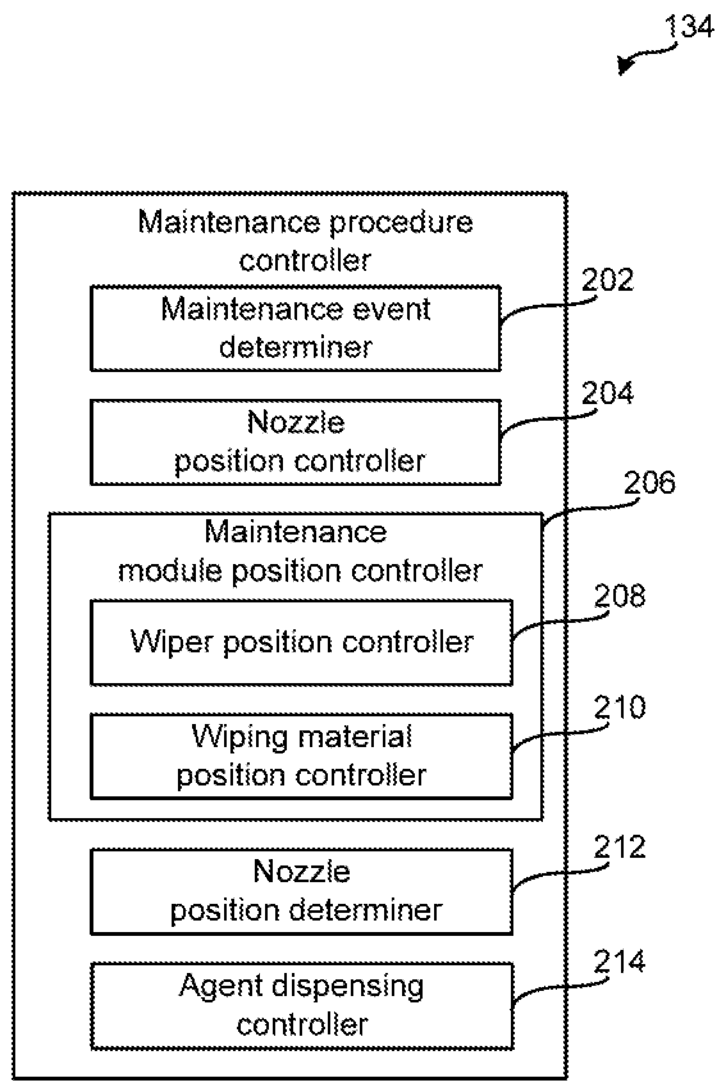
FIG. 2 is a schematic illustration of the example maintenance procedure controller of FIG. 1.

FIG. 2 illustrates an example implementation of the maintenance procedure controller 134 of FIG. 1. As shown in the example of FIG. 2, the maintenance procedure controller 134 includes an example maintenance event determiner 202, an example nozzle position controller 204, an example maintenance module position controller 206 including an example wiper position controller 208 and an example wiping material position controller 210, an example nozzle position determiner 212 and an example agent dispensing controller 214.

In the illustrated example, to determine when to perform a maintenance event, the maintenance event determine 202 determines if a threshold amount of time has lapsed, if a threshold amount of agent has been dispensed from the nozzles 120, if a threshold amount of build material has been distributed by the build material dispenser 110 and/or if a threshold number of objects have been produced. While some reasons for performing a maintenance event are disclosed, a maintenance event may be performed for any other reason. In some examples, when the maintenance event determiner 202 determines to perform a maintenance event, the nozzle position controller 204 causes the second mechanics 114 to move the nozzles 120 relative to the nozzle cover 128 to uncover the nozzles 120 and/or the maintenance module position controller 206 causes the third mechanics 136 to move the nozzle cover 128 relative to the nozzles 120 to uncover the nozzles 120.

In some examples, to position the wiping material 130 to be engaged by the nozzles 120, the wiper position controller 208 causes the third mechanics 136 to move the wiper 132 and/or the wiping material 130 toward the nozzles 120. In some examples, the wiper position controller 208 causes the third mechanics 136 to move the wiper 132 and/or the wiping material 130 to engage the printhead 118 while being spaced from the nozzles 120. In other examples, the wiper position controller 208 causes the third mechanics 136 to move the wiper 132 and/or the wiping material 130 to engage the printhead 118 and/or cover and/or partially cover the nozzle(s) 120.

In some examples, prior to wiping the nozzles 120 with the wiping material 130, the wiping material position controller 210 determines whether to advance the wiping material 130 to enable a different portion of the wiping material 130 to come into contact with the nozzles 120. In some examples, the wiping material position controller 210 determines to advance the wiping material 130 based on a portion of the wiping material 130 previously coming in contact with the nozzles 120, the wiping material 130 contacting the nozzles 120 a threshold number of times and/or if the portion of the wiping material 130 has been exposed to an environment including the build material for a threshold amount of time.

In some examples, to wipe the nozzles 120 with the wiping material 130, the nozzle position controller 204 causes the second mechanics 114 to move the agent dispenser 116, the printhead 118 and/or the nozzles 120 relative to the wiping material 130 as the nozzle position determiner 212 determines the position of the nozzle(s) 120 relative to the wiping material 130. In some examples, when the nozzle(s) 120 position determiner 212 determines that the nozzle(s) 120 is covered (e.g., fully covered, partially covered) and/or immediately adjacent the wiping material 130, the agent dispensing controller 214 causes the nozzle(s) 120 to dispense agent out of the nozzles 120 to increase the draw of the agent from the nozzles 120 during the maintenance event and/or to further encourage build material from exits and/or not entering the nozzles 120.

While an example manner of implementing the maintenance procedure controller 134 of FIG. 1 is illustrated in FIG. 2, one or more of the elements, processes and/or devices illustrated in FIG. 2 may be combined, divided, re-arranged, omitted, eliminated and/or implemented in any other way. Further, the example maintenance event determiner 202, the example nozzle position controller 204, the example maintenance module position controller 206, the example wiper position controller 208, the example wiping material position controller 210, the example nozzle position determiner 212, the example agent dispensing controller 214 and/or, more generally, the example maintenance procedure controller of FIG. 1 may be implemented by hardware, software, firmware and/or any combination of hardware, software and/or firmware. Thus, for example, any of the example maintenance event determiner 202, the example nozzle position controller 204, the example maintenance module position controller 206, the example wiper position controller 208, the example wiping material position controller 210, the example nozzle position determiner 212, the example agent dispensing controller 214 and/or, more generally, the example maintenance procedure controller of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)), When reading any of the apparatus or system claims of this patent to cover a purely software and/or firmware implementation, at least one of the example maintenance event determiner 202, the example nozzle position controller 204, the example maintenance module position controller 206, the example wiper position controller 208, the example wiping material position controller 210, the example nozzle position determiner 212, the example agent dispensing controller 214 and/or, more generally, the example maintenance procedure controller of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example maintenance procedure controller 134 of FIG. 1 may include one or more elements, processes and/or devices in addition to, or instead of, those illustrated in FIG. 2, and/or may include more than one of any or all of the illustrated elements, processes and devices.

Figure 3:
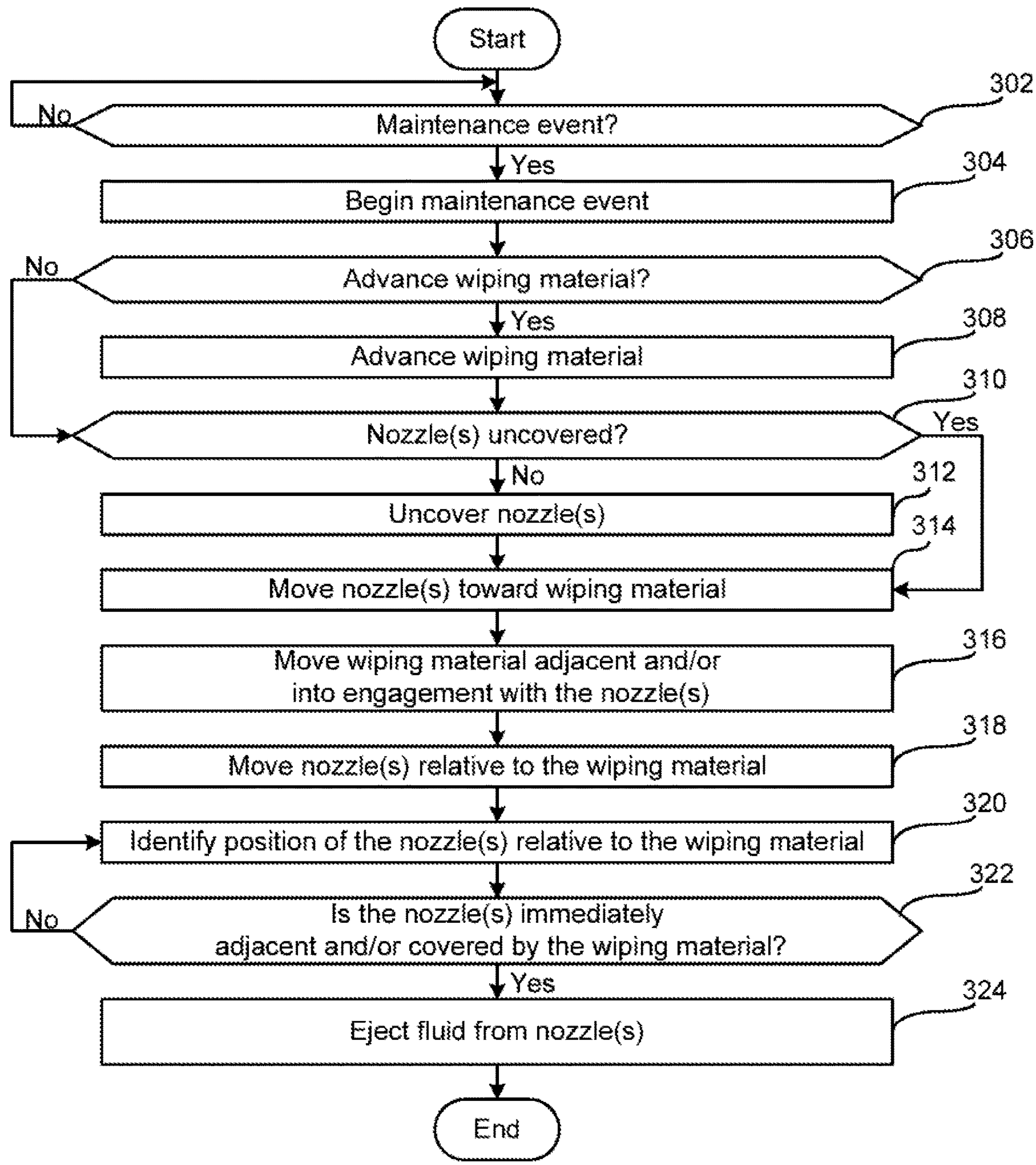
FIG. 3 is a flowchart representative of example machine readable instructions that may be executed to implement the example maintenance procedure controller of FIG. 2.
Figure 4:
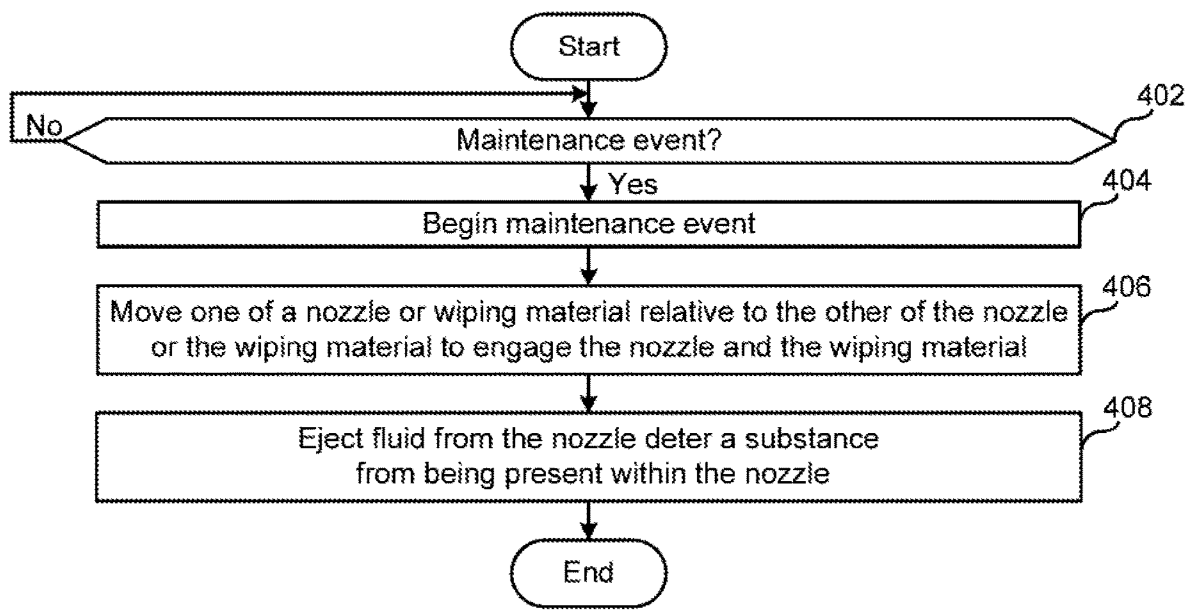
FIG. 4 is another flowchart representative of example machine readable instructions that may be executed to implement the example maintenance procedure controller of FIG. 2.

A flowchart representative of example machine readable instructions for implementing the maintenance procedure controller 134 of FIG. 1 is shown in FIGS. 3 and 4. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3 and 4, many other methods of implementing the example maintenance procedure controller 134 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 3 begins at block 302 with the maintenance event determiner 202 determining if a maintenance event should occur (block 302). In some examples, the maintenance event determiner 202 determines that a maintenance event should occur if a threshold amount of time has lapsed, if a threshold amount of agent has been dispensed from the nozzles 120, if a threshold amount of build material has been distributed by the build material dispenser 110 and/or if a threshold number of objects have been produced by the printer 100.

If the maintenance event determiner 202 determines to perform a maintenance event, the maintenance event begins (block 304) and the wiping material position controller 210 determines whether to advance the wiping material 130 (block 306) in some examples, the wiping material position controller 210 determines to advance the wiping material 130 based on a portion of the wiping material 130 previously coming in contact with the nozzles 120, the wiping material 130 contacting the nozzles 120 a threshold number of times and/or a portion of the wiping material 130 being exposed to an environment including the build material for a threshold amount of time. If the wiping material position controller 210 determines to advance the wiping material 130, the wiping material position controller 210 causes the wiping material 130 to advance (block 308).

At block 310, the nozzle position controller 204 and/or the maintenance module position controller 206 determine whether the nozzle(s) 120 is uncovered (block 310). If the nozzle position controller 204 and/or the maintenance module position controller 206 determine that the nozzle(s) 120 is not uncovered, the nozzle(s) 120 is uncovered by, for example, the nozzle position controller 204 causing the second mechanics 114 to move the nozzles 120 relative to the nozzle cover 128 and/or the maintenance module position controller 206 causing the third mechanics 136 to move the nozzle cover 128 relative to the nozzles 120 (block 312).

To position the nozzle(s) 120 to be engaged by the wiping material 130, the nozzle position controller 204 moves the nozzle(s) 120 toward the maintenance module 126 and/or the wiping material 130 (block 314). To position the wiping material 130 to be engaged by the nozzles 120, the wiper position controller 208 causes the third mechanics 136 to move the wiper 132 and/or the wiping material 130 toward the nozzles 120 (block 316). In some examples, the wiper position controller 208 causes the third mechanics 136 to move the wiper 132 and/or the wiping material 130 to engage the printhead 118 while being spaced from the nozzles 120. In other examples, the wiper position controller 208 causes the third mechanics 136 to move the wiper 132 and/or the wiping material 130 to engage the printhead 118 and/or cover and/or partially cover the nozzle(s) 120.

To wipe the nozzles 120 with the wiping material 130, the nozzle position controller 204 causes the second mechanics 114 to move the agent dispenser 116, the printhead 118 and/or the nozzles 120 relative to the wiping material 130 (block 318) and the nozzle position determiner 212 determines the position of the nozzle(s) 120 relative to the wiping material 130 (block 320). At block 322, the nozzle position determiner 212 determines whether the nozzle(s) 120 is immediately adjacent and/or covered by the wiping material 130 (block 322). If the nozzle position determiner 212 determines that the nozzle(s) 120 is immediately adjacent and/or covered by the wiping material 130, the agent dispensing controller 214 causes the nozzle(s) 120 to dispense agent out of the nozzle(s) 120 as the nozzle(s) 120 engages the wiping material 130 to increase the draw of the agent out of the nozzles 120 during the maintenance event and/or to further encourage build material to exit and/or not enter the nozzles 120 (block 324).

The program of FIG. 4 begins at block 402 with the maintenance event determiner 202 determining if a maintenance event should occur (block 402). In some examples, the maintenance event determiner 202 determines that a maintenance event should occur if a threshold amount of time has lapsed, if a threshold amount of agent has been dispensed from the nozzles 120, if a threshold amount of build material has been distributed by the build material dispenser 110 and/or if a threshold number of objects have been produced by the printer 100.

If the maintenance event determiner 202 determines to perform a maintenance event, the maintenance event begins (block 404) and at least one of the wiper position controller 208 or the nozzle position controller 204 moves one of the nozzle(s) 120 or the wiping material 130 relative to the other of the nozzle(s) 120 or the wiping material 130 to engage the nozzle(s) 120 and the wiping material 130 (block 406). The agent dispensing controller 214 causes fluid to be ejected from the nozzle(s) 120 to deter a substance from being present within the nozzle(s) 120 while the nozzle(s) 120 and the wiping material 130 are in engagement (block 408).

Figure 5:
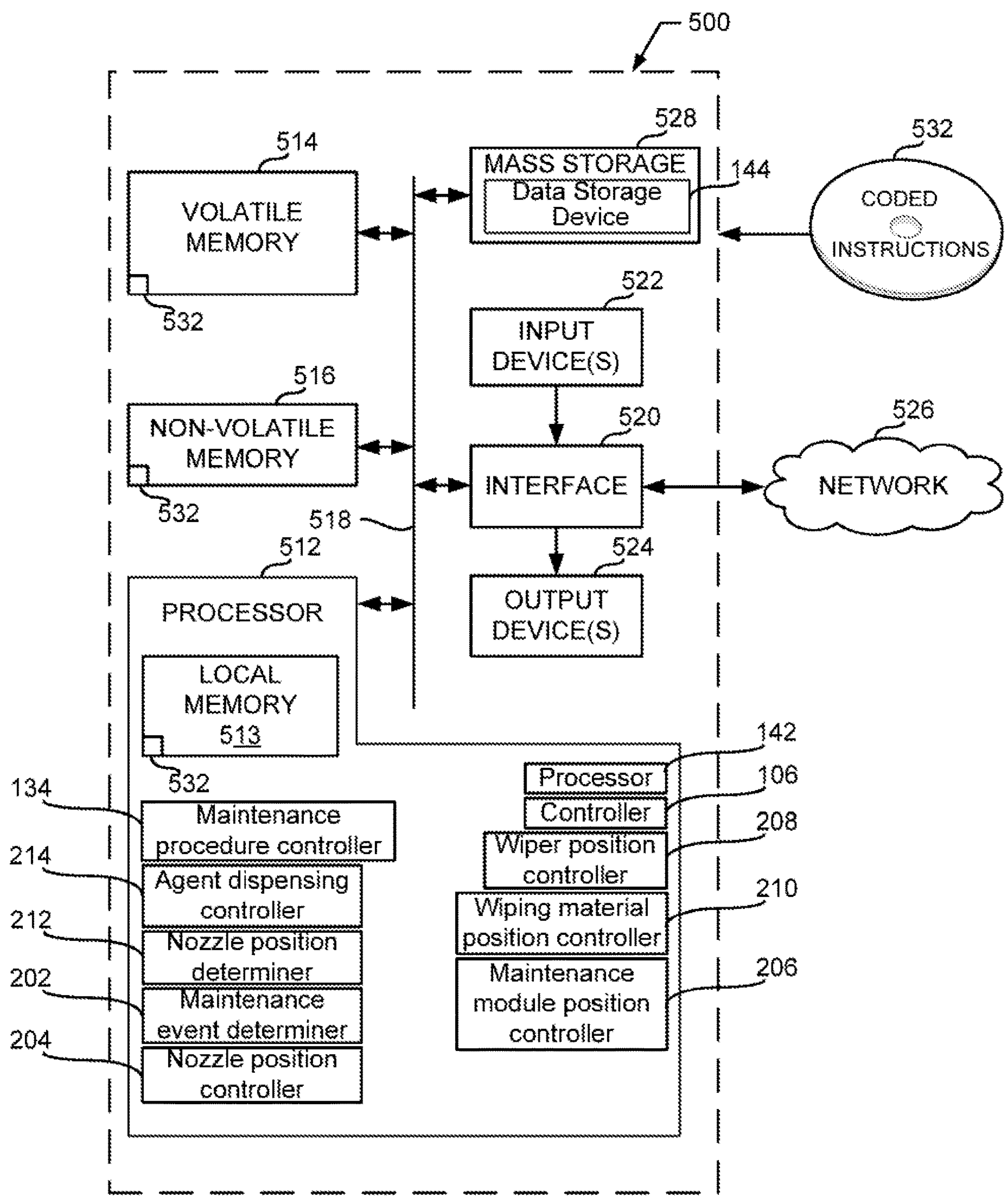
FIG. 5 is a processor platform to execute the instructions of FIGS. 3 and 4 to implement the maintenance procedure controller of FIG. 2 according to an example.

FIG. 5 is a block diagram of an example processor platform 500 capable of executing the instructions of FIGS. 3 and 4 to implement the maintenance procedure controller 134 of FIG. 1. The processor platform 500 can be, for example, a server, a personal computer, a mobile device (e.g., a cell phone, a smart phone, a tablet), a personal digital assistant (PDA), an Internet appliance or any other type of computing device.

The processor platform 500 of the illustrated example includes a processor 512. The processor 512 of the illustrated example is hardware. For example, the processor 512 can be implemented by integrated circuits, logic circuits, microprocessors and/or controllers from any desired family or manufacturer. In the illustrated example, the processor 512 implements the example maintenance procedure controller 134, the example maintenance event determiner 202, the example nozzle position controller 204, the example maintenance module position controller 206, the example wiper position controller 208, the example wiping material position controller 210, the example nozzle position determiner 212, the example agent dispensing controller 214, the example processor 142 and the example controller 106.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, an input device(s) 522 is connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

An output device(s) 524 is also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes a mass storage device(s) 528 for storing software and/or data. Examples of such mass storage devices 528 include floppy disk drives, hard drive disks, compact disk drives, Blu-ray disk drives. RAID systems, and digital versatile disk (DVD) drives. In the illustrated example, the mass storage device(s) 528 implements the data storage device 140.

The coded instructions 532 of FIGS. 3 and 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture relate to extending the useful life of nozzles used in connection with printers, additive manufacturing systems, etc. In some examples, the useful life of the nozzles is extended by performing preventative maintenance procedures including removing particulate (e.g., build material, paper particles, etc.) from the nozzles during a wiping procedure and/or removing undispensed fluid from the nozzles. In contrast to some examples, the examples disclosed herein substantially simultaneously wipe the nozzles while fluid is being dispensed from the nozzles. In other words, the examples disclosed herein enable additional fluid to be drawn out of the nozzle(s) by further saturating wiping material and/or flowing additional fluid out of the nozzle(s). As used herein, the phrase "substantially simultaneously" means that fluid is dispensed from the nozzles when the nozzles are fully covered by the wiping material, partially covered by the wiping material and/or when the wiping material is adjacent the nozzle but not covering the nozzle. In other words, the nozzles may dispense fluid prior to the wiping material covering the nozzles, while the wiping material is covering the nozzles and/or after the wiping material is covering the nozzles.

An example printer includes a nozzle to dispense fluid; a wiper to wipe the nozzle during a maintenance event; and a maintenance event procedure controller to cause the nozzle to dispense fluid during the maintenance event to deter a substance from being present within the nozzle.

In some examples, the substance is a particulate. In some examples, the maintenance event procedure controller is to cause the nozzle to dispense fluid during the maintenance event to deter the substance from being urged into the nozzle by an interaction between the wiper and the nozzle. In some examples, the fluid is an agent, further including an agent dispenser including the nozzle, the agent dispenser to cause the nozzle to dispense the agent onto a work area of the printer during an additive manufacturing procedure. In some examples, the printer includes a build material dispenser, the build material dispenser to dispense build material onto the work area during the additive manufacturing procedure, the agent to be selectively deposited onto the build material by the agent dispenser. In some examples, the printer includes an energy source to apply energy to the build material. In some examples, the maintenance event procedure controller is to cause the nozzle to dispense the fluid onto the wiper during the maintenance event to deter the substance from being present within the nozzle. In some examples, the printer is a three-dimensional printer.

An example method includes determining to perform a maintenance event on a printer; in response to determining to perform the maintenance event on the printer, moving one of a nozzle or wiping material relative to the other of the nozzle or the wiping material to engage the nozzle and the wiping material; and while the wiping material engages or is immediately adjacent the nozzle, ejecting fluid from the nozzle to deter a substance from being present within the nozzle. In some examples, the engaging of the nozzle and the wiping material is to encourage fluid to be drawn out of the nozzle. In some examples, the substance is air. In some examples, the method includes advancing the wiping material to enable an unused portion of the wiping material to engage the nozzle. In some examples, the method of claim 9, after or before the maintenance event, further including depositing build material on a work area, selectively depositing agent from the nozzle onto the build material, and applying energy to the build material to selectively fuse the build material on which the agent has been deposited. In some examples, the moving of the one of the nozzle or the wiping material relative to the other of the nozzle or the wiping material includes moving the wiping material toward the nozzle and moving the nozzle across the wiping material.

An example apparatus includes a maintenance event determiner to determine to perform a maintenance event on a printer; a wiper position controller to control a position of wiping material to be used during the maintenance event; a nozzle position controller to control a position of a nozzle during the maintenance event, in response to the maintenance event determiner determining to perform the maintenance event on the printer, at least one of the wiper position controller or the nozzle position controller to move one of the nozzle or the wiping material relative to the other of the nozzle or the wiping material to engage the nozzle and the wiping material; and a fluid dispensing controller to cause fluid to be ejected from the nozzle to deter a substance from being present within the nozzle while the wiping material engages or is immediately adjacent the nozzle.

In some examples, the apparatus includes a wiper position controller to advance the wiping material to enable an unused portion of the wiping material to engage the nozzle. In some examples, the apparatus includes a build material dispenser to cause build material to be deposited on a work area, an agent dispenser to selectively cause agent to be deposited from the nozzle onto the build material, and an energy source to cause energy to be applied to the build material to selectively fuse the build material on which the agent has been deposited. In some examples, the printer is a three-dimensional printer. In some examples, the substance is a particulate. In some examples, the fluid dispensing controller is to cause the nozzle to dispense fluid onto the wiping material during the maintenance event to deter the substance from being present within the nozzle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A printer, comprising:

a nozzle to dispense fluid;

a wiper to carry wiping material, the wiping material to move relative to the wiper to wipe the nozzle during a maintenance event; and processor circuitry to cause the nozzle to dispense fluid during the maintenance event while the wiping material of the wiper engages the nozzle to deter a substance from being present within the nozzle, the processor circuitry to cause the nozzle and the wiper with the wiping material to translate as the nozzle dispenses the fluid during the maintenance event.

2. The printer of claim 1, wherein the substance includes particulates.

3. The printer of claim 1, wherein the processor circuitry is to cause the nozzle to dispense the fluid during the maintenance event to deter the substance from being urged into the nozzle by an interaction between the wiper and the nozzle.

4. The printer of claim 1, wherein the fluid is an agent, the printer further including an agent dispenser that includes the nozzle, the agent dispenser to cause the nozzle to dispense the agent onto a work area of the printer during an additive manufacturing procedure.

5. The printer of claim 4, further including a build material dispenser, the build material dispenser to dispense build material onto the work area during the additive manufacturing procedure, the agent to be selectively deposited onto the build material by the agent dispenser.

6. The printer of claim 5, further including an energy source to apply energy to the build material to at least partially solidify the build material.

7. The printer of claim 1, wherein the processor circuitry is to cause the nozzle to dispense the fluid onto the wiper during the maintenance event to deter the substance from being present within the nozzle.

8. The printer of claim 1, wherein the printer is a three-dimensional printer.

9. The printer of claim 1, wherein the processor circuitry is to initiate the maintenance event based on an amount of build material dispensed by the nozzle.

10. The printer of claim 1, wherein the processor circuitry is to cause the nozzle to dispense the fluid in response to the nozzle and the wiper being translated simultaneously while the wiping material engages the nozzle.

11. The printer of claim 1, further including a spring-biased follower to urge the wiping material into engagement with the nozzle.

12. The printer of claim 1, wherein the processor circuitry is to cause a cover of the nozzle to move away from the nozzle during the maintenance event to enable the wiping material to engage the nozzle.

13. The printer of claim 1, wherein the processor circuitry is to adjust a movement of the wiping material based on a degree to which a portion of the wiping material has been exposed to build material.

14. The printer of claim 1, wherein the wiper and the nozzle are to translate simultaneously, and wherein the wiper is to translate in a first direction and the nozzle is to translate in a second direction different from the first direction.

15. A method, comprising:
- determining to perform a maintenance event on a printer;
- in response to determining to perform the maintenance event on the printer, moving a nozzle and a wiper supporting wiping material, the wiping material to move relative to the wiper; and
- while the wiping material engages the nozzle, ejecting fluid from the nozzle to deter a substance from being present within the nozzle as the nozzle and the wiper with the wiping material are translated.

16. The method of claim 15, wherein the engaging of the nozzle and the wiping material is to encourage fluid to be drawn out of the nozzle.

17. The method of claim 15, wherein the substance is air.

18. The method of claim 15, further including advancing the wiping material to enable an unused portion of the wiping material to engage the nozzle.

19. The method of claim 15, after or before the maintenance event, further including depositing build material on a work area, selectively depositing agent from the nozzle onto the build material, and applying energy to the build material to selectively fuse the build material on which the agent has been deposited.

20. The method of claim 15, wherein the translating the nozzle and the wiper includes moving the wiping material toward the nozzle and moving the nozzle across the wiping material.

21. An apparatus, comprising:
- memory in the apparatus;
- instructions; and
- processor circuitry to execute the instructions to:
  - determine to perform a maintenance event on a printer,
  - control a position of a wiper carrying wiping material, the wiping material to be used during the maintenance event such that the wiping material moves relative to the wiper,
  - control a position of a nozzle during the maintenance event, in response to the determination to perform the maintenance event on the printer, one of the nozzle or the wiper caused to move relative to the other of the nozzle or the wiper to engage the nozzle and the wiping material,
  - cause fluid to be ejected from the nozzle to deter a substance from being present within the nozzle while the wiping material engages the nozzle, and
  - cause the wiper with the wiping material and the nozzle to translate as the substance is ejected from the nozzle.

* * * * *